US010491704B2

(12) United States Patent
Barrows

(10) Patent No.: US 10,491,704 B2
(45) Date of Patent: Nov. 26, 2019

(54) AUTOMATIC PROVISIONING OF CLOUD SERVICES

(71) Applicant: General Electric Company, Schenectady, NY (US)

(72) Inventor: Jeffrey Barrows, Oakland, CA (US)

(73) Assignee: General Electric Company, Schenectady, NY (US)

( * ) Notice: Subject to any disclaimer, the term of this patent is extended or adjusted under 35 U.S.C. 154(b) by 270 days.

(21) Appl. No.: 15/345,232

(22) Filed: Nov. 7, 2016

(65) Prior Publication Data

US 2018/0131583 A1 May 10, 2018

(51) Int. Cl.
*G06F 15/177* (2006.01)
*H04L 29/08* (2006.01)
*H04L 12/24* (2006.01)

(52) U.S. Cl.
CPC ........ *H04L 67/306* (2013.01); *H04L 41/5051* (2013.01); *H04L 67/16* (2013.01); *H04L 41/5096* (2013.01)

(58) Field of Classification Search
USPC ........................................................ 709/221
See application file for complete search history.

(56) References Cited

U.S. PATENT DOCUMENTS

| | | | | |
|---|---|---|---|---|
| 8,141,090 B1* | 3/2012 | Graupner | ............ | G06F 9/45558 709/225 |
| 8,244,874 B1* | 8/2012 | Thireault | ............ | G06F 9/5055 709/226 |
| 8,504,689 B2* | 8/2013 | Ferris | ............ | G06F 9/5072 709/226 |
| 9,742,684 B1* | 8/2017 | Krotkov | ............ | H04L 47/70 |
| 2007/0101341 A1* | 5/2007 | Downing | ............ | G06F 9/542 719/314 |
| 2010/0169477 A1* | 7/2010 | Stienhans | ............ | G06F 9/5083 709/224 |
| 2011/0016214 A1* | 1/2011 | Jackson | ............ | G06F 9/5044 709/226 |
| 2012/0110394 A1* | 5/2012 | Murakami | ............ | G06F 9/5072 714/48 |
| 2013/0091285 A1* | 4/2013 | Devarakonda | ........ | G06F 9/4856 709/226 |
| 2014/0157262 A1* | 6/2014 | Hicks | ............ | G06F 9/45537 718/1 |
| 2014/0200947 A1* | 7/2014 | Gujar | ............ | G06Q 30/0631 705/7.26 |

(Continued)

*Primary Examiner* — Anthony Mejia
(74) *Attorney, Agent, or Firm* — Fitch Even Tabin & Flannery LLP

(57) ABSTRACT

Systems and methods for automatically provisioning a service instance in a cloud computing system are presented. In an example embodiment, a message is retrieved by one of multiple provisioner nodes from a message queue shared by the provisioner nodes, the message including a service request to provision a service instance on the computing infrastructure. The provisioner node that retrieved the message may determine whether a resource of the computing infrastructure capable of hosting the service instance is available, and if not, may cause a creating on the computing infrastructure of a resource capable of hosting the service instance. The provisioner node may also cause deployment and configuration of software for providing the service instance on the resource.

19 Claims, 9 Drawing Sheets

(56) References Cited

U.S. PATENT DOCUMENTS

| | | | |
|---|---|---|---|
| 2014/0278623 A1* | 9/2014 | Martinez | G06Q 10/06 |
| | | | 705/7.12 |
| 2015/0222694 A1* | 8/2015 | Pandey | H04L 41/0803 |
| | | | 709/220 |
| 2016/0021026 A1* | 1/2016 | Aron | H04L 47/827 |
| | | | 709/226 |
| 2016/0316029 A1* | 10/2016 | Song | H04L 12/40032 |
| 2018/0032323 A1* | 2/2018 | Roy | G06F 8/65 |
| 2018/0034904 A1* | 2/2018 | Roy | H04L 67/1034 |

* cited by examiner

AUTOMATIC PROVISIONING OF CLOUD SERVICES

TECHNICAL FIELD

Embodiments of the present disclosure relate generally to data processing and, more particularly, but not by way of limitation, to a method and system for automatic provisioning of cloud (e.g., Internet-based) services.

BACKGROUND

Generally, cloud computing services are computing services provided on-demand to one or more customers over a communication network (e.g., the Internet), thus relieving the customers of the responsibility of purchasing or leasing the underlying computing systems supporting the desired computing services. One example of such a service is a platform-as-a-service (PaaS), which provides a customer with the computing infrastructure (e.g., servers, virtual machines, operating systems, data storage systems, communication networks, and so on), services (e.g., runtime environment, databases, messaging systems, file systems, and the like), and associated tools (e.g., development toolkit, test suite, version control system, configuration and deployment tools, and so forth) needed to develop, test, deploy, and maintain applications that are ultimately used by the developer or other customers.

In typical platform-as-a-service environments, the customer, whether a developer or end-user, does not manage or control the underlying cloud infrastructure (e.g., the servers, storage systems, and the like provided on the platform), as such control is often under the purview of one or more human operators associated with the platform. Consequently, the provisioning and configuration of the infrastructure tends to be rather static in such systems, with human intervention often required to scale the infrastructure and associated services to meet changes in demand occurring over time.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
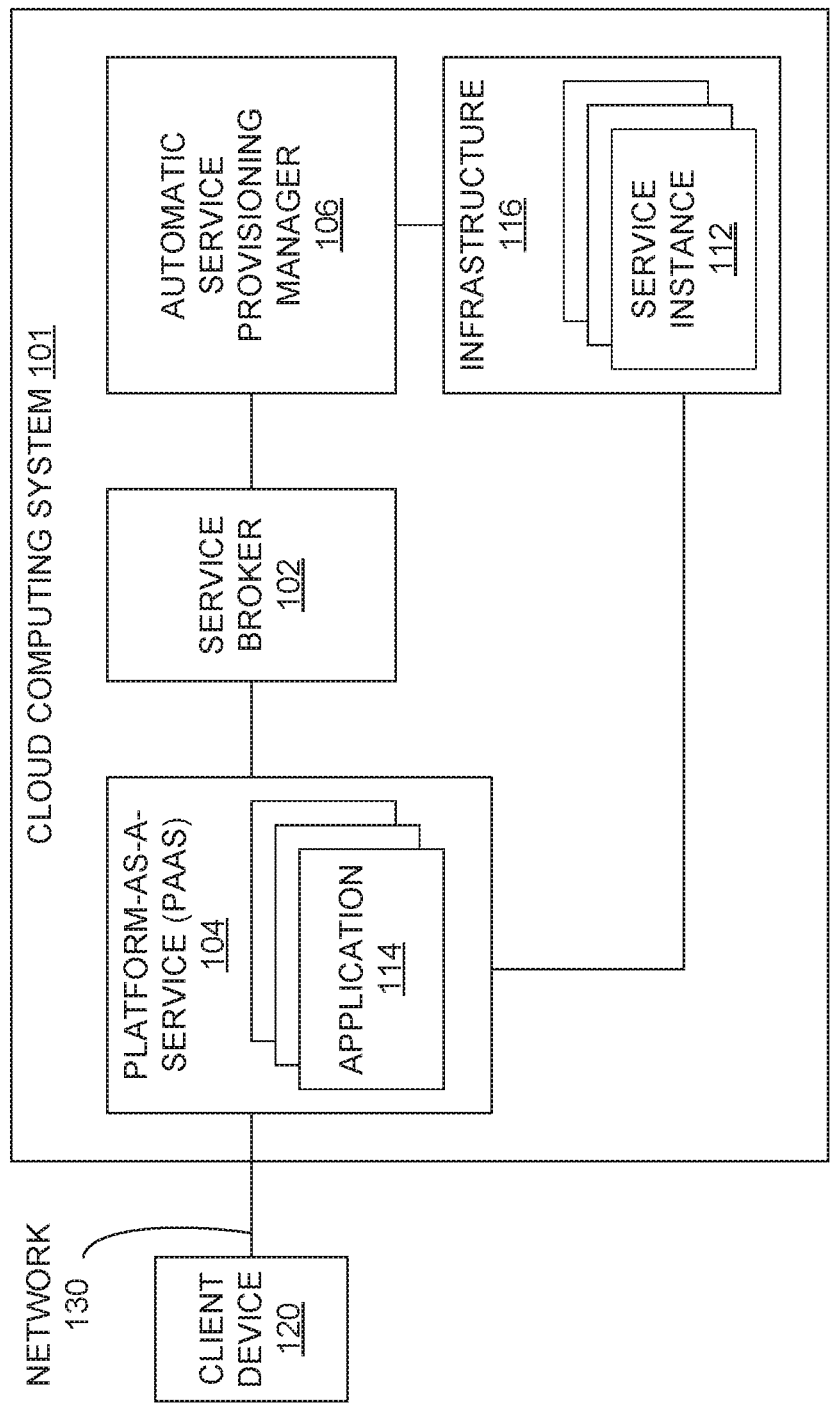
FIG. 1 is a block diagram of an example cloud computing system including an example service broker and an example automatic service provisioning manager operating with example infrastructure.

FIG. 1 is a block diagram of an example cloud computing system 101 including an example platform-as-a-service (PaaS) 104, an example service broker 102, and an example automatic service provisioning manager 106 operating with example infrastructure 116. One or more client devices 120 may be communicatively coupled with the cloud computing system 101 by way of a communication network 130, such as a wide area network (WAN) (e.g., the Internet), a local area network, (LAN), a wireless WAN (WWAN), a wireless LAN (WLAN), a cellular telephone network (e.g., a third-generation (3G) or fourth-generation (4G) network), another communication network or connection, or some combination thereof.

The client device 120 may include, but is not limited to, a desktop computer, a laptop computer, a tablet computer, a smart phone, or any other computing device or communication device capable of communicating with the cloud computing system 101 over the network 130 via messages, data packets, or other communication data structures. In an example embodiment, the client device 120 may communicate with the cloud computing system 101 using Hypertext Transfer Protocol (HTTP) via a web server (not explicitly depicted in FIG. 1). However, other communication protocols or methods may be employed in other embodiments.

In an example embodiment, the client device 120 may be operated by a software developer or related personnel to develop, test, deploy, and/or manage one or more software applications. In another example embodiment, the client device 120 may be operated by a software user or customer to access and use an application deployed on the cloud computing system 101. Other potential roles served by the client device 120 are also possible.

As depicted in the example embodiment of FIG. 1, the cloud computing system 101 includes a PaaS 104 having one or more applications 114 that require one or more services provided by the cloud computing system 101 to execute on the PaaS 104. Such services may include, but are not limited to, a runtime environment, a database, a file system, and a messaging system. The one or more applications 114 may include an application that is in the process of being developed or tested, an application that has been deployed for end-user access, and the like. In an example embodiment, the PaaS 104 may be configured to provide an application programming interface (API) that receives and processes requests from the client device 120 to provision or deprovision one or more services provided by the cloud computing system 101, as well as bind or unbind a provisioned service to a particular application 114. An example embodiment of the PaaS 104 is Cloud Foundry®, which is an open source cloud computing PaaS, a commercial version of which is provided by Pivotal Software, Inc.

The service broker 102 may be configured to receive requests from the PaaS 104 regarding the provisioning and deprovisioning of services, as well as the binding and unbinding of those services to one or more applications 114, and provide corresponding requests to the automatic service provisioning manager 106. In an example embodiment, the service broker 102 is configured to provide a service broker with which a cloud controller (as provided in a Cloud Foundry® PaaS) may communicate to perform provisioning and binding of services. An example embodiment of the service broker 102 is described below in conjunction with FIG. 2.

The automatic service provisioning manager 106 may be configured to receive the provisioning and binding requests generated by the service broker 102 and, in response to those requests, determine which resources of the infrastructure 116 may be employed to provide the requested service, and generate and issue requests to those resources of the infrastructure 116 to provision those services.

The infrastructure 116 may include resources such as, but not limited to, one or more servers, operating systems executing on one or more servers, virtual machines operating on one or more servers, data storage systems (e.g., magnetic and/or optical disk drive systems, flash data storage systems, and so on), communication networks coupling servers, data storage systems, and other components. In an example embodiment, one or more components of the infrastructure 116 may execute software in response to receiving a request from the automatic service provisioning manager 106 to create or provide any resources in the infrastructure 116, and perform the requested provisioning and binding operations for one or more instances of the service (termed "service instances" 112 herein) indicated in the request on those resources. Example embodiments of the infrastructure 116 are described more fully below in conjunction with FIG. 3.

Portions of the automatic service provisioning manager 106 and the infrastructure 116 may include software executed using an infrastructure configuration management tool. In an example embodiment, the automatic service provisioning manager 106 and the infrastructure 116 may employ Chef® by Chef Software Inc., a configuration management tool that facilitates the development and implementation of system configuration routines for servers and other infrastructure 116 components.

In at least some embodiments of the cloud computing system 101 of FIG. 1, the service broker 102, and possibly the automatic service provisioning manager 106 and portions of the infrastructure 116, may serve as a functional "bridge" between the PaaS 104 (e.g., Cloud Foundry®) and an infrastructure configuration management tool (e.g., Chef®) to provide dynamic and automatic provisioning of service instances 112 on available infrastructure 116, typically with little-to-no human operator intervention. In some example embodiments, the cloud computing system 101 may facilitate dynamic horizontal scaling of resources to match more closely the demand for those resources. This dynamic scaling may help facilitate the use of stateful services (e.g., services that maintain a state that is modified over multiple requests), which are ordinarily difficult to scale, with stateless applications, which in certain environments (e.g., web applications) are often favored to reduce local storage requirements, session support, and so on.

The cloud computing system 101, in some example embodiments, may further employ parallelism to serve concurrent requests for service instances 112 to more quickly and efficiently satisfy those requests. In addition, the cloud computing system 101 may possess the ability to perform failover from failing service instances 112, servers or virtual machines, data storage systems, and other components of the overall infrastructure 116 to other available components to maintain a high level of performance and availability for the applications 114 developed and/or used via the client device 120.

Figure 2:
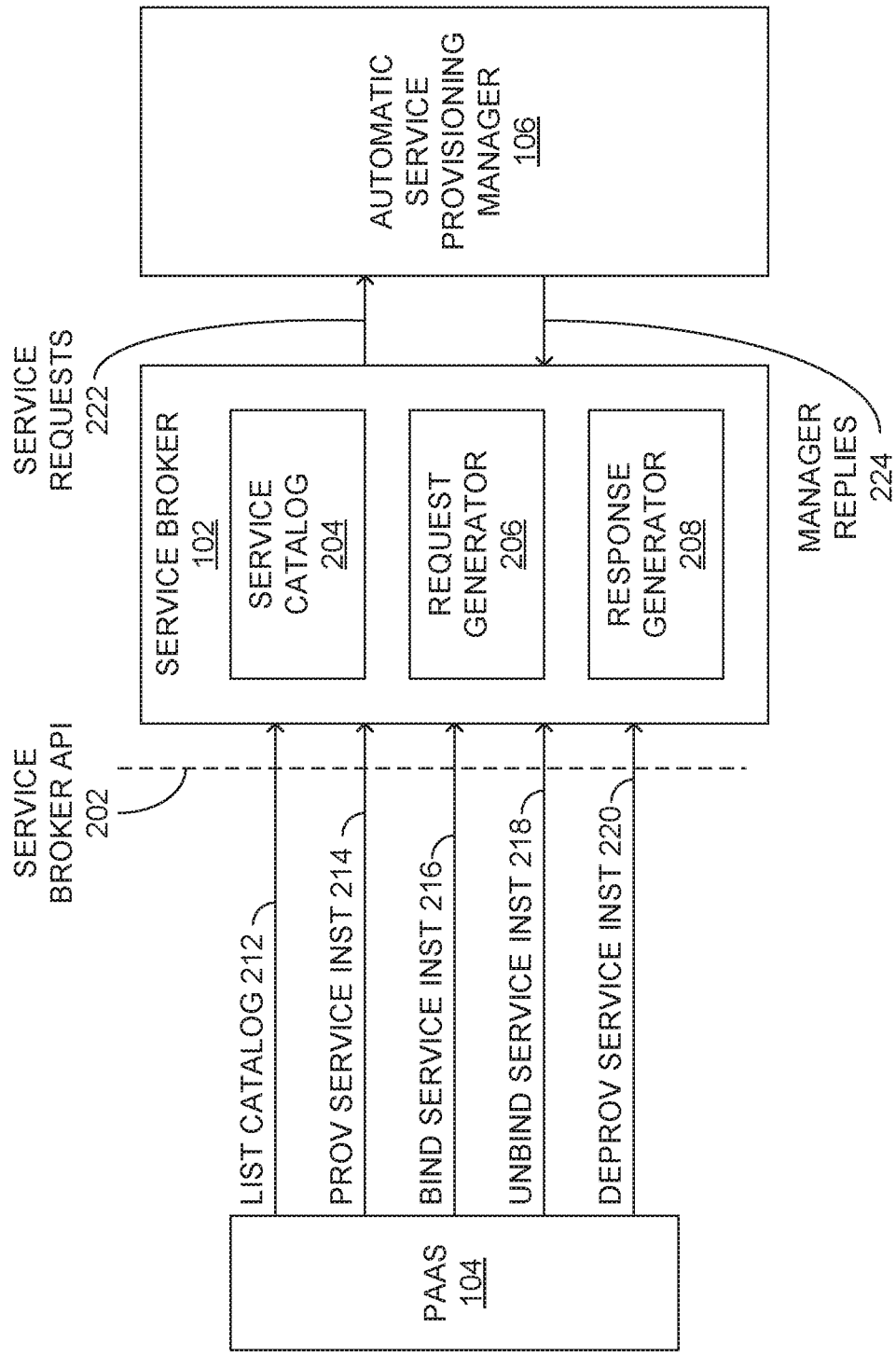
FIG. 2 is a block diagram of the example service broker of FIG. 1.

FIG. 2 is a block diagram of the example service broker 102 of FIG. 1. As depicted, the service broker 102 may include a service catalog 204, a request generator 206, and a response generator 208. Such components or modules, in an example embodiment, as well as other components or modules described herein, may be implemented as instructions executable by one or more hardware processors of a machine, such as a server or other computing system.

The request generator 206 may receive requests from the PaaS 104 to provide and configure one or more service instances 112 for use by one or more applications 114 provided by the PaaS 104 for use via the client device 120. A list of possible requests from the PaaS 104 in an example embodiment are depicted in FIG. 2: a list catalog request 212, a provision service instance request 214, a bind service instance request 216, an unbind service instance request 218, and a deprovision service instance request 220. In other example embodiments, the request generator 206 may receive other types of requests (e.g., an Update Service request), but such requests are not discussed in detail hereinafter. The possible requests, as well as possible responses returned by the service broker 102 to the PaaS 104 upon completion of processing of the requests 212-220, may conform to a service broker API 202 provided by the service broker 102 for use by the PaaS 104. The modules 204, 206, 208, in an example embodiment described below, may process the requests 212-220 from the PaaS 104 and provide the associated responses to the PaaS 104 according to the service broker API 202.

In an example embodiment, the service catalog 204 may be configured to store or access information specifying a number of services available for provisioning and deployment on the infrastructure 116. Such information may include, for example, an identity of the service, a version number associated with the service, and other data facilitating use of the service by an application 114. Accordingly, in response to receiving a list catalog request 212, the response generator 208 may be configured to return at least some information included in the service catalog 204 to the PaaS 104 to inform the PaaS 104 of the services available, as well as various aspects or characteristics of those services.

In an example embodiment, the request generator 206, in response to a provision service instance request 214 received from the PaaS 104, may generate one or more service requests 222 causing the automatic service provisioning manager 106 to provision one or more service instances 112 identified in the provision service instance request 214 on the infrastructure 116. Once the requested service instance 112 is provisioned on the infrastructure 116, as indicated in a manager reply 224 from the automatic service provisioning manager 106, the response generator 208 may generate a response indicating that the requested service instance 112 has been provisioned and is available for binding with one or more applications 114.

Correspondingly, the request generator 206, in response to a deprovision service instance request 220, may generate one or more service requests 222 causing the automatic service provisioning manager 106 to deprovision previously provisioned service instances 112 identified in the deprovision service instance request 220 on the infrastructure 116. Once the indicated service instance 112 has been deprovisioned, as indicated in a corresponding manager reply 224 from the automatic service provisioning manager 106, the response generator 208 may generate a response indicating that the requested service instance 112 has been deprovisioned and is thus no longer available for binding with one or more applications 114.

Also in an example embodiment, the request generator 206, in response to a bind service instance request 216, may generate one or more service requests 222 causing the automatic service provisioning manager 106 to bind a currently provisioned service instance 112 to a particular application 114 to facilitate use of the service instance 112 by the application 114, with the service instance 112 and the particular application 114 being identified in the bind service instance request 214. Once the indicated service instance 112 has been bound to the application 114, as indicated in a corresponding manager reply 224 from the automatic service provisioning manager 106, the response generator 208 may generate a response indicating that the requested service instance 112 and the indicated application 114 have been bound, thus allowing the application 114 to use the service instance 112.

Also, the request generator 206, in response to an unbind service instance request 218, may generate one or more service requests 222 causing the automatic service provisioning manager 106 to unbind a service instance 112 from an application 114 to which the service instance 112 is currently bound, with the service instance 112 and the particular application 114 being identified in the unbind service instance request 118. Once the indicated service instance 112 has been unbound from the application 114, as indicated in a corresponding manager reply 224 from the automatic service provisioning manager 106, the response generator 208 may generate a response indicating that the requested service instance 112 and the indicated application 114 have been unbound, thus preventing the application 114 from currently using the service instance 112 while allowing the service instance 112 to remain provisioned for subsequent binding to another application 114.

In other example embodiments, the service broker 102 may employ a binding/unbinding module (not explicitly shown in FIG. 2) to process binding service instance requests 216 and unbinding service requests 218 internally using information provided in one or more manager replies 224 previously provided to the service broker 102 from the automatic service provisioning manager 102 in response to one or more service requests 222 requesting the provisioning of a service instance 112. Accordingly, based on that internal processing, the response generator 208 may generate the appropriate response indicating the binding or unbinding of a service instance 112 and application 114 indicated in the corresponding binding service instance request 216 or unbinding service instance request 218.

Figure 3:
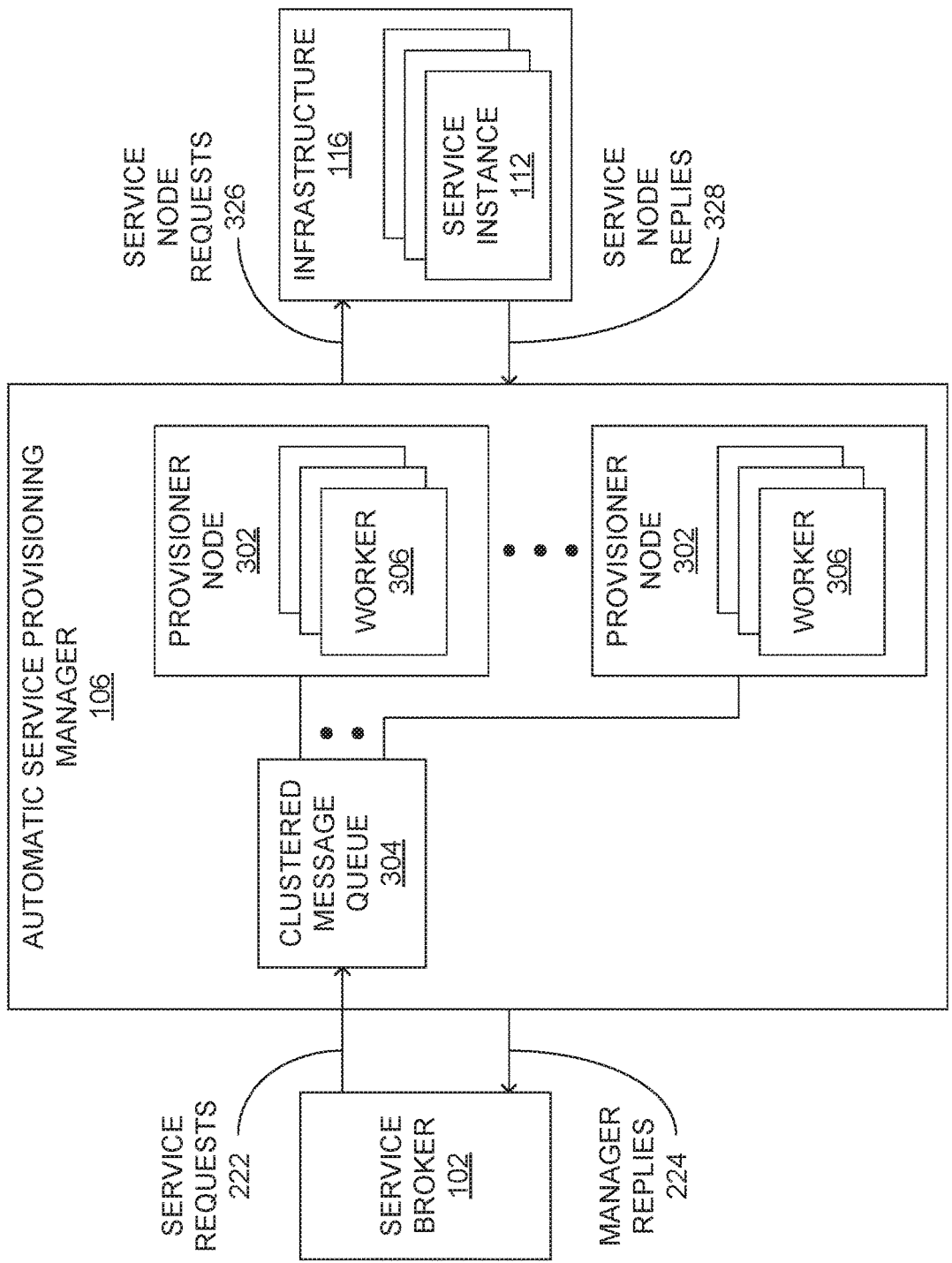
FIG. 3 is a block diagram of the example automatic service provisioning manager of FIG. 1.

FIG. 3 is a block diagram of the example automatic service provisioning manager 106 of FIG. 1. As illustrated in the example embodiment of FIG. 3, the automatic service provisioning manager 106 may include one or more provisioner nodes 302 that are configured to receive the service requests 222 and generate the manager replies 224 discussed above. As used herein, each provisioner node 302 is implemented as a separate process, virtual machine, server, and the like, or some combination thereof that performs the operations ascribed to the provisioner node 302, as described hereafter. Consequently, multiple provisioner nodes 302 may operate concurrently to process service requests 222 received from the service broker 102, and to provide the manager response 224 to the service broker 102.

The automatic service provisioning manager 106 may also include a clustered message queue 304, and each provisioner node 302 may include one or more processing threads or workers 306. In an example embodiment, the clustered message queue 304 receives a copy of each service request 222 provided by the service broker 102 to the automatic service provisioning manager 106. Each worker 306 may then retrieve the next service request 222 from the clustered message queue 304, resulting in that service request 222 being unavailable to other workers 306 in any of the provisioner nodes 302. Consequently, the workers 306 of all provisioner nodes 302 may operate concurrently in processing the service requests 222 received from the service broker 106. One example of the clustered message queue 304 may be implemented using RabbitMQ™, an open source message broker, although other types of message queues, clustered or otherwise, may be employed in other embodiments.

Each worker 306, after retrieving a service request 222 from the clustered message queue 304, may process the service request 222 to determine the particular service involved and the particular operation (e.g., provision or deprovision a service instance, bind or unbind a provisioned service instance 112 and an application 114) requested.

Presuming the retrieved service request 222 requests the provisioning of a service instance 112, the worker 306 may determine whether one or more resources of the infrastructure 116 (e.g., one or more servers, one or more virtual machines, one or more data storage systems, and so on) capable of hosting the requested service instance 112 currently exist. The worker 306 may make such a determination based on data stored in a data storage device that identifies available resources. If such a resource is lacking, the worker 306 may interact with the infrastructure 116 to identify a portion of the infrastructure 116 (e.g., a server) to be used, and create such a resource (e.g., start up a new virtual machine on the server). In an example embodiment that uses Chef®, the worker 406 may employ "Chef Provisioning" to create that resource, which may include the creation of a "service node" on the resource, as is described in greater detail below in conjunction with FIG. 4.

Presuming the existence of a capable resource, whether preexisting (e.g., based on the data stored in a data storage device that identifies available resources) or newly created by a worker 306, the worker 306 may then generate and provide to the identified resources that are running on a service node one or more service node requests 326 to provision the service instance 112 on those resources. An example of the provisioning of the service instance 112 (e.g., deploying of software for providing the service on the infrastructure, configuring the software appropriately, and so on) is described below in conjunction with FIG. 4.

Presuming the retrieved service request 222 requests the deprovisioning of a service instance 112, the worker 306 may identify the one or more resources of the infrastructure 116 being employed to host the indicated service instance 112. Based on that identification (e.g., via data stored in a data storage device correlating provisioned service instances 112 to the resources of the infrastructure 116 they consume), the worker 306 may generate and provide to the identified resources one or more service node requests 326 to deprovision the service instance 112 on those resources. In addition, the worker 306 may destroy or remove the resource (e.g., stop the virtual machine that provided the service instance 112) from the infrastructure 116. In one example embodiment, the worker 306 may determine whether the resource is currently needed for another service instance 112, and if so, refrain from destroying the resource.

If the retrieved service request 222 requests the binding or unbinding of a resource instance 112 with an application 114, the worker 306 may either perform such binding or unbinding internally, or may issue one or more service node requests 326 to the resources of the infrastructure 116 hosting the indicated service instance 112 to perform the requested binding or unbinding operation, as discussed above.

In an example embodiment, the runtime framework that provides the provisioner nodes 302, as well as the clustered message queue 304 and workers 306 included therein, may be provisioned, configured, and executed using a Chef® "cookbook," or by employing another configuration tool. Using such a cookbook, systems or virtual machines serving as the provisioner nodes 302 may operate as "chef-clients" executing in daemon mode (e.g., as a background process that may execute periodically and briefly). In an example embodiment, systems or virtual machines upon which the provisioner nodes 302 operate may be located on infrastructure 116 that is the same as, or is different from, the infrastructure 116 hosting the service instances 112.

In some example embodiments employing Chef®, in response to a request to bind a resource instance 112 with an application 114, a provisioner node 302 may retrieve username, password, endpoint address, and/or other binding information from a system-wide-accessible data area (e.g., a Chef® "data-bag") and return that information as a manager reply 224 to the service broker 102, which, in turn, may return that information to the PaaS 104 for use in the corresponding application 114. In response to an associated unbind request for the corresponding resource instance 112 and application 114, the provisioner node 302 may remove the binding information (e.g., username, password, and endpoint address) from the application 114 runtime space, resulting in the unbinding of the application 114 from the resource instance 112.

Figure 4:
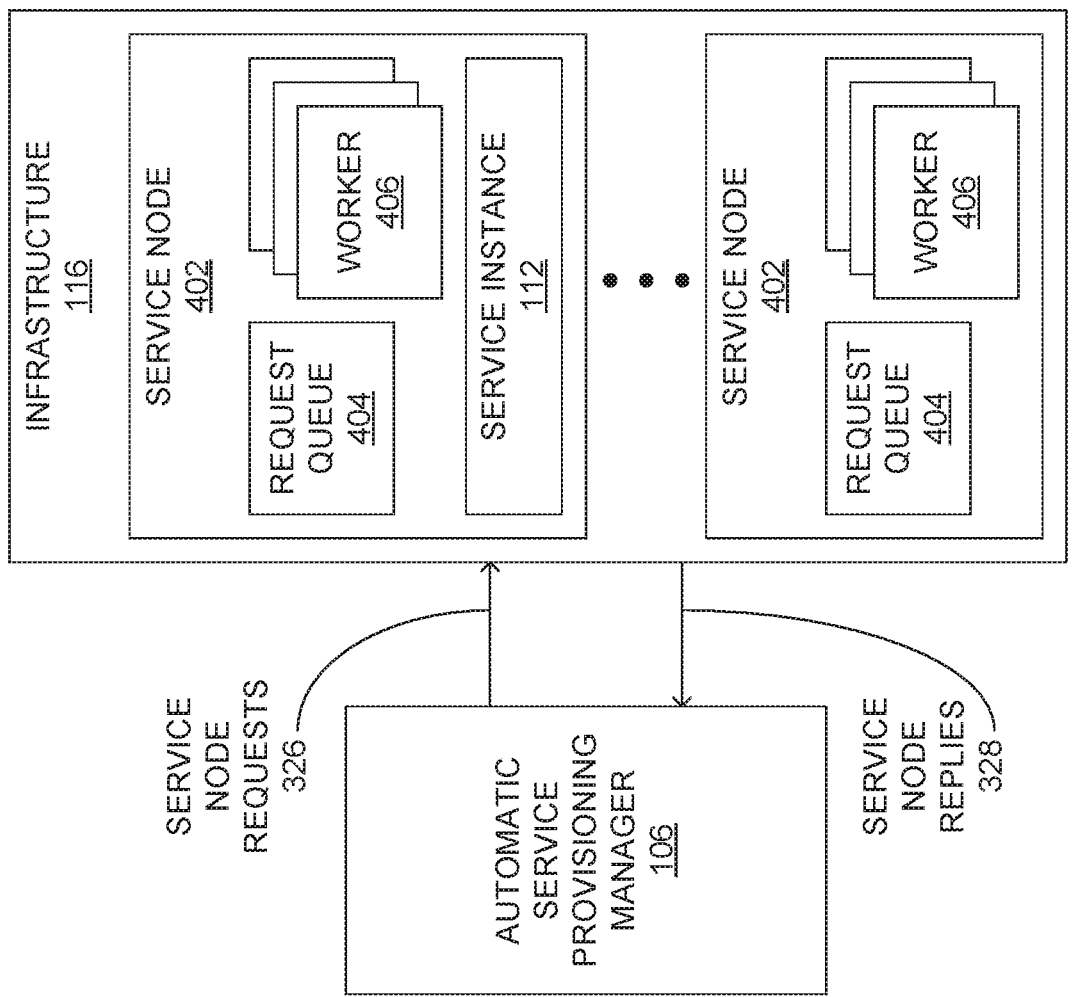
FIG. 4 is a block diagram of the example infrastructure of FIG. 1.

FIG. 4 is a block diagram of the example infrastructure 116 of FIG. 1. The infrastructure 116, as depicted in FIG. 4, may include one or more service nodes 402, upon which may be provisioned and deployed one or more service instances 112. Each service node 402 may be configured to receive service node requests 326 from one or more provisioner nodes 302, and generate and provide service node replies 328 to the provisioner nodes 302 after processing the service node requests 326. In an example embodiment, each service node 402 may be implemented on a separate process, virtual machine, server, and the like, or some combination thereof upon which a corresponding service instance 112 is, or is to be, hosted.

Each service node 402 may include a request queue 404 and at least one processing thread or worker 406. In an example embodiment, each request queue 404 receives service node requests 326 to be serviced by that service node 402 provided by any of the provisioner nodes 302. In addition, the one or more service instances 112 to which the service node requests 326 pertain may be hosted on the particular resource or portion of the infrastructure 116 on which the service node 402 is executing.

In an example embodiment, in response to a service node request 326 indicating a particular service instance 112 to be provisioned, a worker 406 may access various data based on the indication of the service instance 112 in the service node request 326. That data may include the actual software to be executed, configuration data for executing the software, and the like. In an example embodiment in which Chef® is utilized, the worker 406 may obtain a Chef® cookbook, such as from a "chef-server," and execute a "run-list" (e.g., an ordered list of operations to perform, or actions to take) in the cookbook to load, configure, and execute the software for the service instance 112. Also in an example embodiment, a worker 306 of a provisioner node 302 may monitor or manage a service instance 112 or associated service node 402 periodically, as is described in greater detail below.

In response to a service node request 326 indicating a particular service instance 112 to be stopped or deprovisioned, a worker 406 may process the service node request 326, in an example embodiment, by executing another run-list of a Chef® cookbook to stop the service instance 112 and reallocate the memory and other resources consumed by the service instance 112.

After the processing of a particular service node request 326, the worker 406 may then return a service node reply 328 to the requesting provisioner node 302 including information regarding the provisioning or deprovisioning of the service instance 112. Such information may include, whether the provisioning or deprovisioning succeeded, information that allows use of the service instance 112 by an application 114, and so on. In an example embodiment, the worker 406 may place the service node reply 328 in a reply queue (not explicitly depicted in FIG. 3 or FIG. 4) of the provisioner node 302 that sourced the service node request. Also in an example embodiment, the provisioner node 302 may create the reply queue specifically for one or more service node replies 328 corresponding to the service node request 326.

Figure 5:
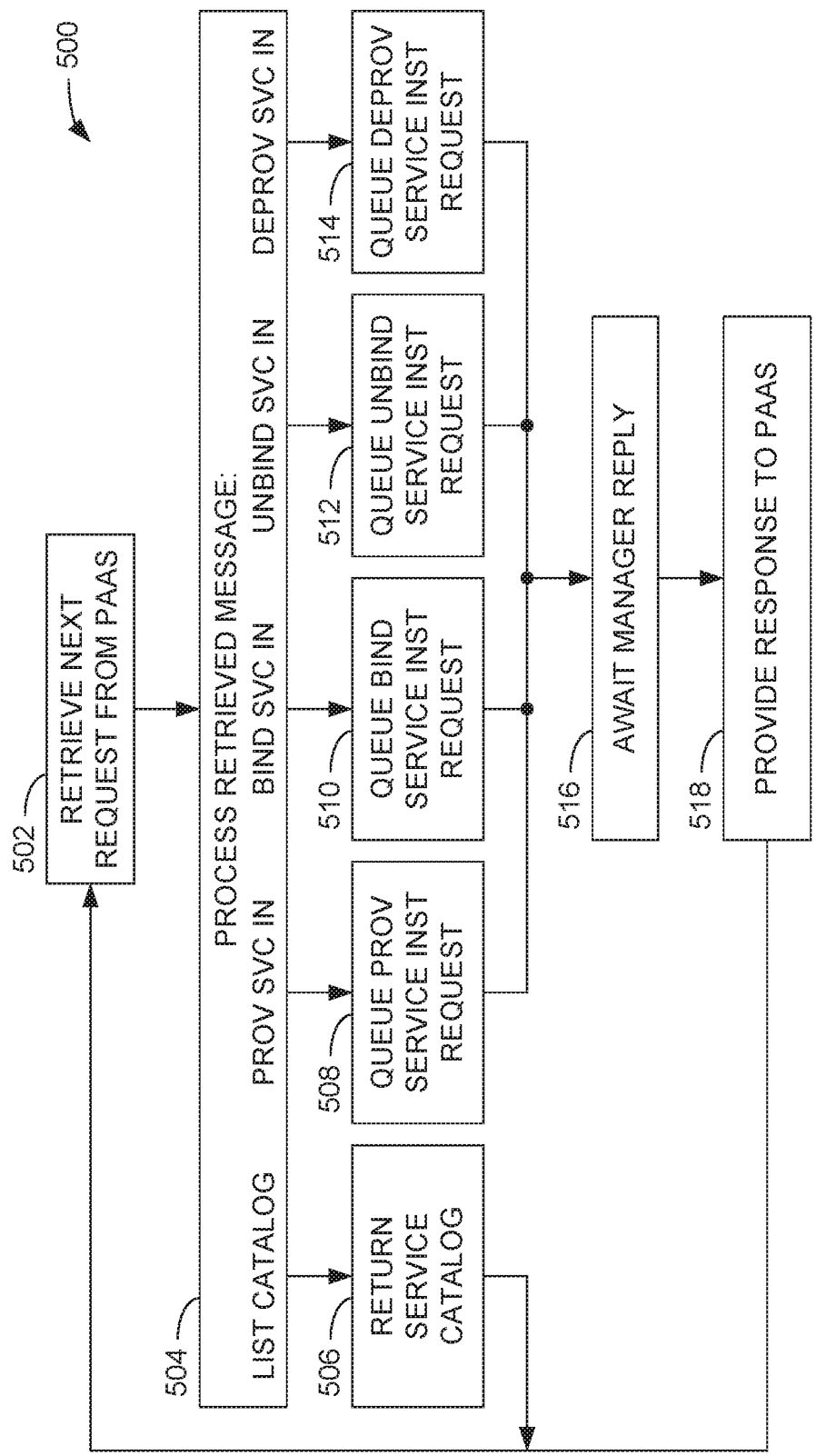
FIG. 5 is a flow diagram of an example method of operating the example service broker of FIG. 2.

FIG. 5 is a flow diagram of an example method 500 of operating the example service broker 102 of FIG. 2. While the method 500, as well as other methods presented herein, is described in view of the environment of the cloud computing system 101 of FIG. 1 and its various components of FIGS. 2-4, other systems or devices not specifically discussed herein may perform the same operations in other embodiments. In the method 500, the service broker 102 may retrieve the next service request from the PaaS 104 (operation 502). If the request is a list catalog request 212 (operation 504), the service broker 102 may return at least some information from the service catalog 204 to the PaaS 104 (operation 506). Such information may list the various services available, characteristics or aspects of each service, a version of the service being provided, and so on.

If the request is a provision service instance request 214 (operation 504), the request generator 206 may issue a service request 222 to the clustered message queue 304 of the automatic service provisioning manager 106 to request the provisioning of a service instance 112 for a particular service indicated in the provision service instance request (operation 508). If, instead, the request is a deprovision service instance request 220 (operation 504), the request generator 206 may issue a service request 222 to the clustered message queue 304 to request the deprovisioning of a particular service instance 112 indicated in the deprovision service instance request 220 (operation 514).

If the request received from the PaaS 104 is a bind service instance request 216 (operation 504), the request generator 206 may issue a service request 222 to the clustered message queue 304 to request the binding of a provisioned service instance 112 with a particular application 114 (operation 510), as indicated in the bind service instance request 216. Oppositely, if the request received from the PaaS 104 is an unbind service instance request 218 (operation 504), the request generator 206 may issue a service request 222 to the clustered message queue 304 to request the unbinding of a provisioned service instance 112 from a particular application 114 (operation 512), as indicated in the unbind service instance request 218.

In an example embodiment of the method 500, the service broker 102 may await a manager reply 224 from the automatic service provisioning manager 106 (operation 516) indicating a conclusion of the processing of the service request 222. The response generator 208 of the service broker 102 may then generate a response to the PaaS 104 (operation 518). The response may include information as to whether the particular operation corresponding to the received request from the PaaS 104 was successful, any information regarding the results of the requested operation (e.g., information to facilitate accessing a requested service instance 112), and so on.

Figure 6:
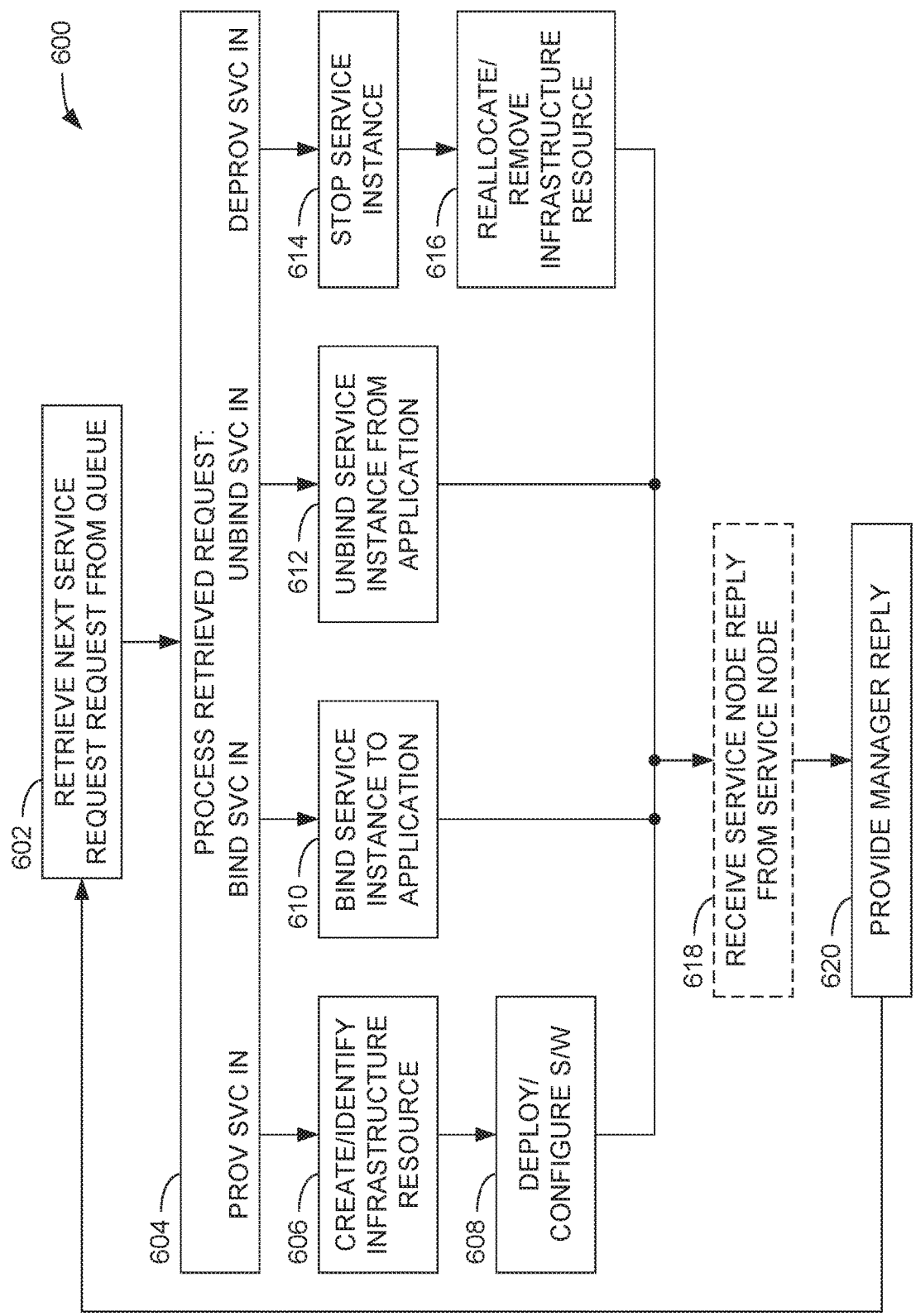
FIG. 6 is a flow diagram of an example method of operating one or more provisioner nodes of the example automatic service provisioning manager of FIG. 3 to provision, bind, unbind, and deprovision service instances on the infrastructure.

FIG. 6 is a flow diagram of an example method 600 of operating one or more provisioner nodes 302 of the example automatic service provisioning manager 106 of FIG. 3 to provision, bind, unbind, and deprovision service instances 112 on the infrastructure 116. In the method 600, a worker 306 retrieves a service request 222 from the clustered message queue 304 (operation 602). If the retrieved service request 222 is a provision service instance request (operation 604), the worker 306 may then create an infrastructure 116 resource (e.g., a virtual machine) if a capable resource for hosting the requested service instance 112 is not available, or may identify a preexisting infrastructure 116 resource (operation 606), and then deploy and configure the service instance 112 on the resource (operation 608), as discussed above. If, instead, the retrieved service request 202 is a deprovision service instance request (operation 604), the worker 306 may deprovision or stop the service instance 112 indicated in the service request 222 (operation 614), and may reallocate or remove (e.g., destroy) the infrastructure 116 resource that hosted the service instance 112 (operation 616).

If, instead, the retrieved service request 222 is a bind service instance request or an unbind service instance request (operation 604), the worker 306 may cause such binding or unbinding to occur (operations 610 and 612), either directly within the automatic service provisioning manager 106, or in conjunction with one or more service nodes 402 of the infrastructure 116.

Performing one or more of the operations 606-616 associated with a retrieved service request 222 may involve the generation of one or more service node requests 326, as described above. Accordingly, the worker 306 may receive one or more service node replies 328 in response to the generated service node requests 326 (operation 618). Based on the service node replies 328, as well as any operations performed by the worker 306, the worker 306 may generate a manager reply 224 in response to the retrieved service request 222 (operation 620) to inform the automatic service provisioning manager 106 of the completed processing of the service request 322.

Figures 7, 8:
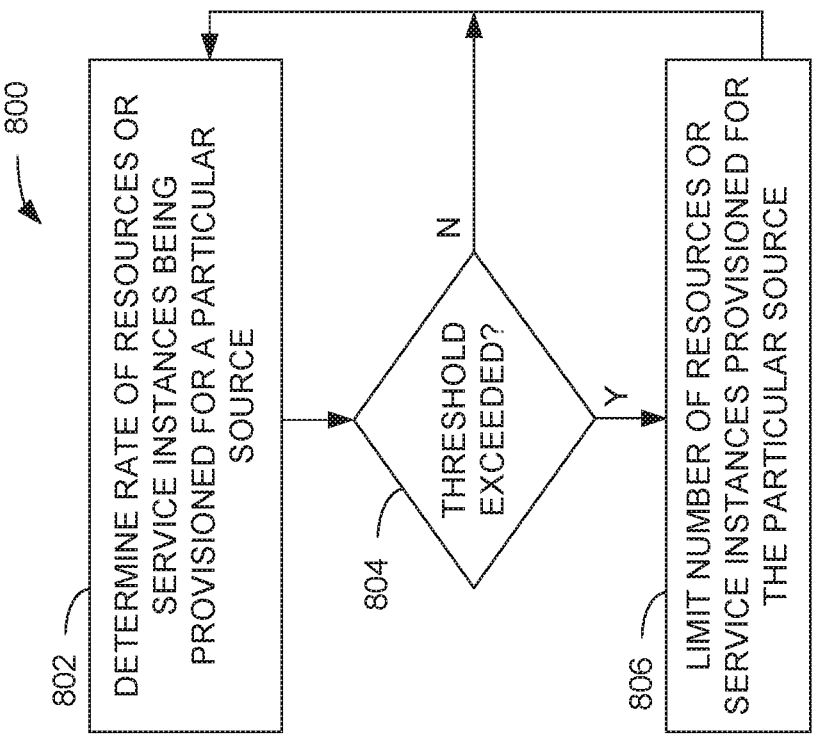
FIG. 7 is a flow diagram of an example method of operating one or more provisioner nodes of the example automatic service provisioning manager of FIG. 3 to horizontally scale the infrastructure.
FIG. 8 is a flow diagram of an example method of operating one or more provisioner nodes of the example automatic service provisioning manager of FIG. 3 to limit provisioning of resources or service instances for a particular source.

FIG. 7 is a flow diagram of an example method 700 of operating one or more provisioner nodes 302 of the example automatic service provisioning manager 112 of FIG. 3 to horizontally scale the infrastructure 116. In the method 702, a provisioner node 302 may determine an amount of infrastructure 116 that is currently available for provisioning of resources and/or service instances 112 (operation 702). In an example embodiment, the provisioner node 302 may access system-wide-accessible data (e.g., as included in a Chef® data-bag) indicating those resources remaining unprovisioned, those resources that are provisioned but not currently providing service instances 112, and so on to make the determination. If the amount of available infrastructure 116 lies outside some range (operation 704), the provisioning node 302 may cause the reservation of additional infrastructure 116 (if the amount of available infrastructure lies below the range), or may cause the release of some current infrastructure 116 (if the amount of available infrastructure exceeds the range) (operation 706).

FIG. 8 is a flow diagram of an example method 800 of operating one or more provisioner nodes of the example automatic service provisioning manager 106 of FIG. 3 to limit provisioning of infrastructure 116 resources or service instances 112 for a particular source (e.g., a particular client device 120) or group of sources. In some example embodiments, the rapid provisioning of resources or service instances 112 by a single client device 120 or multiple client devices 120 may be an indication of at least one malicious actor attempting to consume all available resources to reduce the effectiveness of the cloud computing system 101. In the method 800, a provisioner node 302 may determine a rate of resources or service instances 112 being provisioned for a particular client device 120 (or a group of client devices 120) (operation 802). If the rate of provisioning (e.g., the number of resources consumed over some period of time) exceeds some threshold (operation 804), the provisioner node 302 may limit the number of resources or service instances provisioned for the particular client device 120 or group of client devices 120 (operation 806). In other example embodiments, other methods for determining whether an inordinate number of resources or service instances 112 are being provisioned for a particular source may use metrics other than a provisioning rate, such as a comparison of a provisioning rate versus a deprovisioning rate for a client device 120. In an example embodiment, the provisioner node 302 may access system-wide-accessible data (e.g., as included in a Chef® data-bag) indicating each resource or service instance 112 that has been provisioned, a timestamp indicating when the resource or service instance 112 was provisioned, the client device 120 or associated entity for which the resource of service instance 112 was provisioned, and the like to determine if a threshold indicating a malevolent actor has been exceeded.

Figure 9:
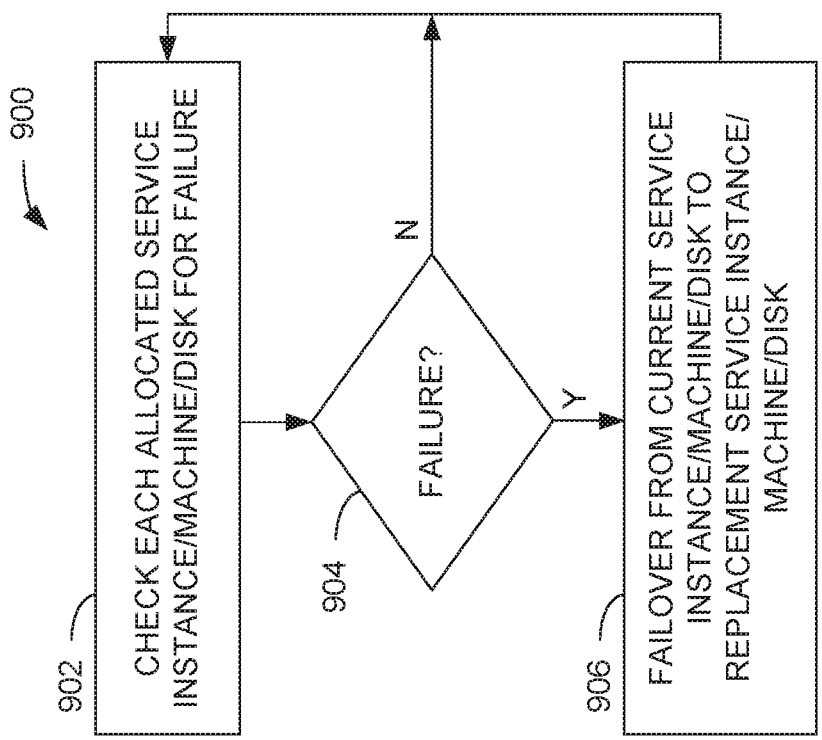
FIG. 9 is a flow diagram of an example method of operating one or more provisioner nodes of the example automatic service provisioning manager of FIG. 3 to perform failover from a service instance or infrastructure component to another.

FIG. 9 is a flow diagram of an example method 900 of operating one or more provisioner nodes 302 of the example automatic service provisioning manager 106 of FIG. 3 to perform failover from a service instance 112 or infrastructure 116 resource to another. In the method 900, a provisioner node 302 may check each service instance 112 that is bound to an application 114 for failure (operation 902). In an example embodiment, the provisioner node 302 may access system-wide-accessible data (e.g., a Chef® data-bag) indicating a current operational state of the service instance 112. If the data indicates that a failure of a service instance 112 has occurred (operation 904), such as the existence of a memory access error, an execution out-of-bounds error, or the like, the provisioner node 302 may "failover" from the current service instance 112 to a new service instance 112 (operation 906). For example, the provisioner node 302 may automatically shut down the service instance 112, reload the service instance 112 on the same or different infrastructure 116 resource, and restart the service instance 112 to address the failure.

Similarly, in other example embodiments, the provisioner node 302 may perform failover operations for a failed processor, virtual machine, data storage system, and so on. For example, in the case of failed processor or virtual machine, the provisioner node 302 may deprovision the service instances 112 and the resource (e.g., processor or virtual machine) hosting the service instance 112, reprovision the same resource or provision a new resource, and reprovision the service instance 112 on that resource. In at least some example embodiments, explicit unbinding and rebinding of the service instance 112 to the application 114 that was employing the service instance 112 would be unnecessary if the associated binding information (e.g., username, password, endpoint address, and so on) remains in a system-wide-accessible memory area (e.g., a Chef® data-bag), as the provisioner node 302 may merely retrieve the binding information from that area and store it in the application 114 runtime space. In the case of a failed data storage system, the provisioner node 302 may direct data accesses for the data storage system to a backup system, reprovision the data storage system, copy data from the backup system to the restarted system, and redirect further data accesses to the restarted system. In another example embodiment, the provisioner node 302 may employ a newly provisioned data storage system as a replacement for the failed data storage system.

In an example embodiment, a method for automatically provisioning a service instance on computing infrastructure comprises retrieving, by one of a plurality of provisioner nodes executing on one or more hardware processors and from a message queue shared by the plurality of provisioner nodes, a message comprising a service request, the service request comprising a request to provision a service instance on the computing infrastructure; determining, at the one of the plurality of provisioner nodes, whether a resource of the computing infrastructure capable of hosting the service instance is available; causing, in response to a determination that a resource of the computing infrastructure capable of hosting the service instance is not available, a creating, on the computing infrastructure, of a resource capable of hosting the service instance; and automatically causing deployment and configuration of software for providing the service instance on the resource.

In another example embodiment, including all previous example embodiments, the retrieving of the message prevents others of the plurality of provisioner nodes from retrieving the message.

In another example embodiment, including all previous example embodiments, the method further comprises generating, after the causing of the deployment and configuration of software for providing the service instance on the resource, a reply for the request, the reply indicating the provisioning of the service instance; and transferring the reply to a source of the message.

In another example embodiment, including all previous example embodiments, the provisioner node comprises a plurality of worker threads operating concurrently, one of the plurality of worker threads performing the retrieving of the message, the determining of whether a resource of the computing infrastructure capable of hosting the service instance is available, the causing of creating a resource capable of hosting the service instance, and the causing of the deployment and configuration of software for providing the service instance on the resource.

In another example embodiment, including all previous example embodiments, the resource comprises a virtual machine, and the creating of the resource comprises starting the virtual machine on a server of the computing infrastructure.

In another example embodiment, including all previous example embodiments, the message comprises a first message, the request comprises a first service request, and the method further comprises retrieving, by one of the plurality of provisioner nodes from the message queue, a second message comprising a second service request, the second service request comprising a request to bind the provisioned service instance to an application executing on a platform-as-a-service; retrieving, in response to the second service request, binding information corresponding to the provisioned service instance; generating a reply for the second service request, the reply comprising the binding information; and transferring the reply to a source of the second message.

In another example embodiment, including all previous example embodiments, the binding information comprises an endpoint address for accessing the provisioned service instance.

In another example embodiment, including all previous example embodiments, the binding information comprises a username and password for accessing the provisioned service instance.

In another example embodiment, including all previous example embodiments, the method further comprises retrieving, by one of the plurality of provisioner nodes from the message queue, a third message comprising a third service request, the third service request comprising a request to unbind the provisioned service instance from the application executing on the platform-as-a-service; and removing, in response to the third service request, the binding information corresponding to the provisioned service instance from a runtime space of the application.

In another example embodiment, including all previous example embodiments, the message comprises a first message, the request comprises a first service request, and the method further comprises retrieving, by one of the plurality of provisioner nodes from the message queue, a second message comprising a second service request, the second service request comprising a request to deprovision the provisioned service instance; and stopping, in response to the second service request, the provisioned service instance.

In another example embodiment, including all previous example embodiments, the service instance comprises a first service instance, and the method further comprises reallocating the resource on which the first service instance was provisioned for use by another service instance.

In another example embodiment, including all previous example embodiments, the method further comprises determining whether another service instance is awaiting to be provisioned, the reallocating of the resource being performed based on a determination that another service instance is awaiting to be provisioned.

In another example embodiment, including all previous example embodiments, the method further comprises removing the resource from the computing infrastructure based on a determination that another service instance is not awaiting to be provisioned.

In another example embodiment, including all previous example embodiments, the causing of the creating of the resource comprises issuing a first request to a service node executing on the computing infrastructure to create the resource, and the causing of the deployment and configuration of software for providing the service instance on the resource comprises issuing a second request to the service node to deploy and configure the software on the resource.

In another example embodiment, including all previous example embodiments, the resource is located on a same server as the service node.

In another example embodiment, including all previous example embodiments, the method further comprises determining, by at least one of the plurality of provisioner nodes, a current level of the computing infrastructure currently available for provisioning of resources; reserving, based on the current level being below a range of computing infrastructure, additional computing infrastructure to be available for provisioning of resources; and releasing, based on the current level being above the range of computing infrastructure, a portion of the computing infrastructure from being available for provisioning of resources.

In another example embodiment, including all previous example embodiments, the method further comprises determining, by at least one of the plurality of provisioner nodes, a rate of service instances being provisioned for a particular source; and limiting, based on the rate of service instances being provisioned exceeding a threshold rate, a number of service instances provisioned for the particular source.

In another example embodiment, including all previous example embodiments, the method further comprises determining, by at least one of the plurality of provisioner nodes, whether a service instance has failed; and performing a failover, based on a determination that a service instance has failed, from the failed service instance to another service instance.

In an example embodiment, a system comprises one or more hardware processors; and a memory storing instructions that, when executed by at least one of the one or more hardware processors, cause the system to perform operations comprising retrieving, by one of a plurality of provisioner nodes from a message queue shared by the plurality of provisioner nodes, a message comprising a service request, the service request comprising a request to provision a service instance on the computing infrastructure; determining, at the one of the plurality of provisioner nodes, whether a resource of the computing infrastructure capable of hosting the service instance is available; causing, in response to a determination that a resource of the computing infrastructure capable of hosting the service instance is not available, a creating, on the computing infrastructure, of a resource capable of hosting the service instance; and causing deployment and configuration of software for providing the service instance on the resource.

In an example embodiment, a non-transitory computer-readable storage medium storing instructions that, when executed by at least one hardware processor of a machine, cause the machine to perform operations comprising retrieving, by one of a plurality of provisioner nodes from a message queue shared by the plurality of provisioner nodes, a message comprising a service request, the service request comprising a request to provision a service instance on the computing infrastructure; determining, at the one of the plurality of provisioner nodes, whether a resource of the computing infrastructure capable of hosting the service instance is available; causing, in response to a determination that a resource of the computing infrastructure capable of hosting the service instance is not available, a creating, on the computing infrastructure, of a resource capable of hosting the service instance; and causing deployment and configuration of software for providing the service instance on the resource.

Figure 10:
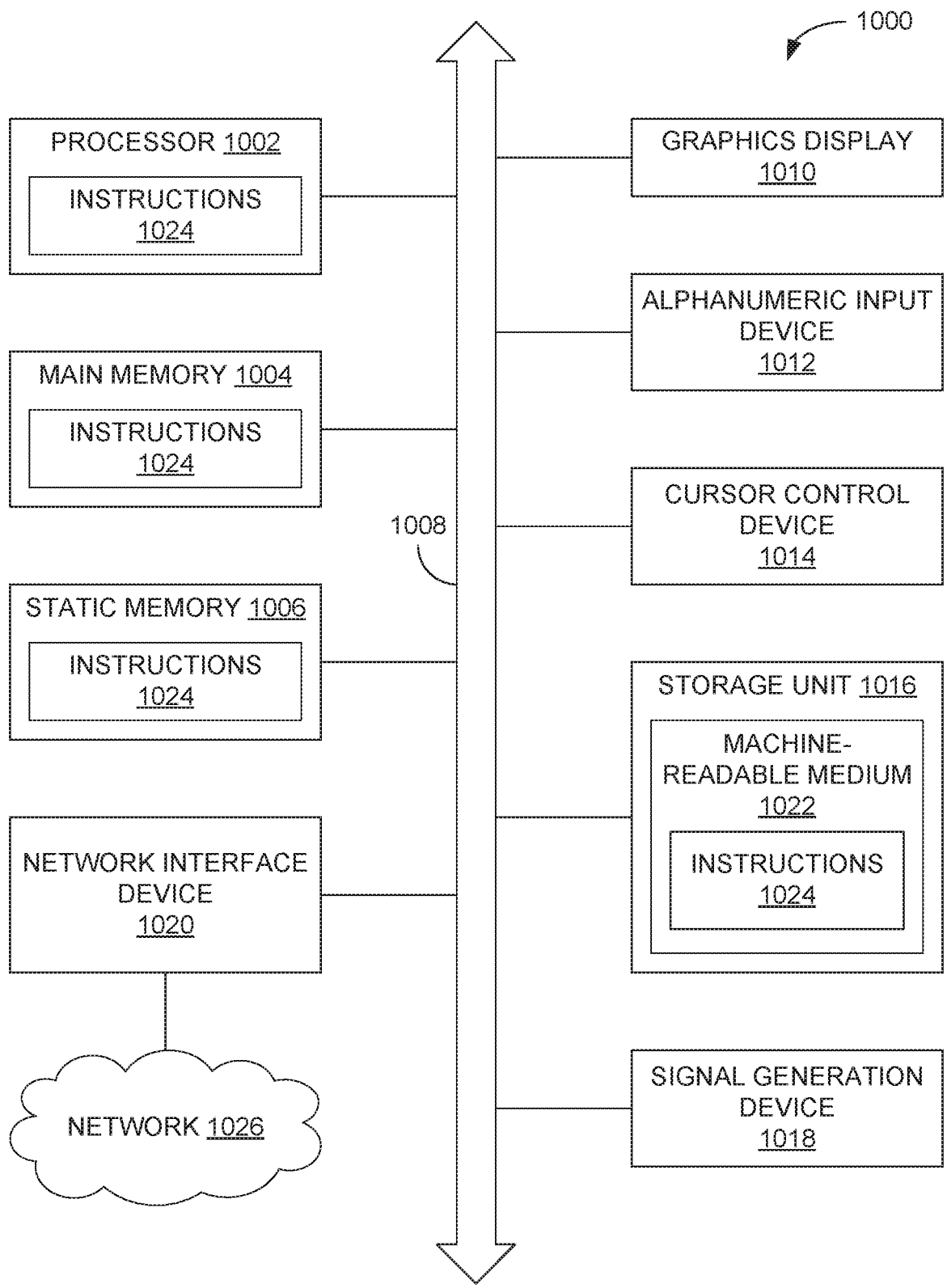
FIG. 10 is a block diagram of a machine or device in the example form of a computer system within which instructions for causing a machine or device to perform any one or more of the methodologies discussed herein may be executed.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, or a computer-readable storage medium) and perform any one or more of the methodologies discussed herein, in whole or in part. Specifically, FIG. 10 depicts the machine 1000 in the example form of a computer device (e.g., a computer) within which the instructions 1024 (e.g., software, firmware, a program, an application, an applet, an app, or other executable code) for causing the machine 1000 to perform any one or more of the methodologies discussed herein, in whole or in part.

For example, the instructions 1024 may cause the machine 1000 to execute the flow diagrams of FIGS. 5-9, as well as all example embodiments associated therewith. The instructions 1024 can transform the general, non-programmed machine 1000 into a particular machine (e.g., specially configured machine) programmed to carry out the described and illustrated functions in the manner described. Also, in example embodiments, the machine 1000 may operate as one or more of the modules or components of the service broker 102, automatic service provisioning manager 106, and the infrastructure 116 of FIGS. 1-4, or any other computing system or device described herein.

In example embodiments, the machine 1000 operates as a standalone device or may be connected (e.g., networked) to other machines. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 1000 capable of executing the instructions 1024, sequentially or otherwise, that specify actions to be taken by that machine 1000. Further, while only a single machine 1000 is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light-emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes the machine-readable medium 1022 (e.g., a tangible machine-readable storage medium) on which is stored the instructions 1024 embodying any one or more of the methodologies or functions described herein. The instructions 1024 may also reside, completely or at least partially, within the main memory 1004, within the processor 1002 (e.g., within a cache memory of the processor 1002), or both, before or during execution thereof by the machine 1000. Accordingly, the main memory 1004 and the processor 1002 may be considered machine-readable media 1022 (e.g., tangible and non-transitory machine-readable media).

In some example embodiments, the machine 1000 may be a portable or mobile computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1022 able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium" shall also be taken to include any medium, or combination of multiple media, that is capable of storing instructions 1024 for execution by a machine (e.g., machine 1000), such that the instructions 1024, when executed by one or more processors of the machine 1000 (e.g., processor 1002), cause the machine 1000 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 1022 is non-transitory in that it does not embody a propagating or transitory signal. However, labeling the machine-readable medium 1022 as "non-transitory" should not be construed to mean that the medium is incapable of movement; the medium should be considered as being transportable from one physical location to another in some example embodiments. Additionally, since the machine-readable medium 1022 is tangible, the medium may be considered a machine-readable device.

The instructions 1024 may further be transmitted or received over a communications network 1026 using a transmission medium via the network interface device 1020 and utilizing any one of a number of well-known transfer protocols (e.g., Hypertext Transfer Protocol (HTTP)). Examples of communication networks 1026 include a local area network (LAN), a wide area network (WAN), the Internet, mobile telephone networks, plain old telephone service (POTS) networks, and wireless data networks (e.g., Wi-Fi®, LTE®, and WiMAX™ networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain example embodiments are described herein as including logic or a number of components, modules, or mechanisms. Modules may constitute either software modules (e.g., code embodied on a machine-readable medium 1022 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for automatically provisioning a service instance on computing infrastructure, the method comprising:
   providing a plurality of provisioner nodes, each of the provisioner nodes being a separate process, the provisioner nodes executing on one or more hardware processors, wherein each provisioner node includes a plurality of processing threads;
   providing a message queue that is coupled to the plurality of provisioner nodes, wherein the message queue receives a service request from a service broker;
   retrieving, by a first one of the plurality of provisioner nodes from the message queue shared by the plurality of provisioner nodes, a first message comprising a first service request, the first service request comprising a request to provision a first service instance on the computing infrastructure;
   wherein a first processing thread of the first one of the provisioning nodes retrieves the first service request resulting in the first service request being unavailable to other processing threads of other provisioner nodes;

determining, at the one of the plurality of provisioner nodes, whether a first resource of the computing infrastructure capable of hosting the first service instance exists;

in response to a determination that a resource of the computing infrastructure capable of hosting the service instance does not exist, creating, on the computing infrastructure, a new resource capable of hosting the first service instance, the new resource not existing prior to making the determination;

automatically deploying and configuring of software for providing the first service instance on the first or new resource;

retrieving, by a second one of a plurality of provisioner nodes from the message queue shared by the plurality of provisioner nodes, a second message comprising a second service request, the second service request comprising a request to deprovision a second service instance on the computing infrastructure;

wherein a second processing thread of the second one of the provisioning nodes retrieves the second service request resulting in the second service request being unavailable to other processing threads of other provisioner nodes;

identifying a second resource of the infrastructure hosting the second service instance and responsively removing the second resource from the infrastructure;

retrieving, by a third one of a plurality of provisioner nodes from the message queue shared by the plurality of provisioner nodes, a third message comprising a third service request, the third service request comprising a request to bind or unbind a resource instance with a n application;

wherein a third processing thread of the third one of the provisioning nodes retrieves the third service request resulting in the third service request being unavailable to other processing threads of other provisioner nodes;

wherein the third processing thread performs the binding or unbinding, or issues a service node request to resources of the infrastructure to perform the binding or unbinding;

wherein the first processing thread of the first one of the plurality of service nodes, the second processing thread of the second one of the plurality of service nodes, and the third processing thread of the third one of the plurality of service nodes perform operations concurrently;

wherein each of the plurality of provisioner nodes is operated to purposefully and horizontally scale the computing infrastructure by determining an amount of infrastructure that is currently available for provisioning of resources and service instances, and when the amount is below a predetermined range, reserve additional infrastructure, and when the amount infrastructure exceeds the predetermined range, release at least some of the infrastructure, wherein the horizontal scaling is dynamic and occurs over time.

2. The method of claim 1, the retrieving of the message preventing others of the plurality of provisioner nodes from retrieving the message.

3. The method of claim 1, further comprising:
generating, after deploying and configuring the software for providing the service instance on the resource, a reply for the request, the reply indicating the provisioning of the service instance; and
transferring the reply to a source of the message.

4. The method of claim 1, the provisioner node comprising a plurality of worker threads operating concurrently, one of the plurality of worker threads performing the retrieving of the message, the determining of whether a resource of the computing infrastructure capable of hosting the service instance is available, the creating of a new resource capable of hosting the service instance, and the deploying and configuring of the software for providing the service instance on the resource.

5. The method of claim 1, the resource comprising a virtual machine, and the creating of the resource comprising starting the virtual machine on a server of the computing infrastructure.

6. The method of claim 1, the message comprising a first message, the request comprising a first service request, the method further comprising:
retrieving, by one of the plurality of provisioner nodes from the message queue, the second message comprising a second service request, the second service request comprising a request to bind the provisioned service instance to an application executing on a platform-as-a-service;
retrieving, in response to the second service request, binding information corresponding to the provisioned service instance;
generating a reply for the second service request, the reply comprising the binding information; and
transferring the reply to a source of the second message.

7. The method of claim 6, the binding information comprising an endpoint address for accessing the provisioned service instance.

8. The method of claim 6, the binding information comprising a username and password for accessing the provisioned service instance.

9. The method of claim 6, comprising:
retrieving, by one of the plurality of provisioner nodes from the message queue, a third message comprising a third service request, the third service request comprising a request to unbind the provisioned service instance from the application executing on the platform-as-a-service; and
removing, in response to the third service request, the binding information corresponding to the provisioned service instance from a runtime space of the application.

10. The method of claim 1, the message comprising a first message, the request comprising a first service request, the method further comprising:
retrieving, by one of the plurality of provisioner nodes from the message queue, a second message comprising a second service request, the second service request comprising a request to deprovision the provisioned service instance; and
stopping, in response to the second service request, the provisioned service instance.

11. The method of claim 10, the service instance comprising a first service instance, the method further comprising: reallocating the resource on which the first service instance was provisioned for use by another service instance.

12. The method of claim 11, further comprising:
determining whether another service instance is awaiting to be provisioned;
the reallocating of the resource being performed based on a determination that another service instance is awaiting to be provisioned.

13. The method of claim 12, further comprising:
removing the resource from the computing infrastructure based on a determination that another service instance is not awaiting to be provisioned.

14. The method of claim 1, wherein the creating of the resource comprises issuing a first request to a service node executing on the computing infrastructure to create the resource, and the deploying and configuring of the software for providing the service instance on the resource comprises issuing a second request to the service node to deploy and configure the software on the resource.

15. The method of claim 14, the resource being located on a same server as the service node.

16. The method of claim 1, further comprising:
determining, by at least one of the plurality of provisioner nodes, a rate of service instances being provisioned for a particular source; and
limiting, based on the rate of service instances being provisioned exceeding a threshold rate, a number of service instances provisioned for the particular source.

17. The method of claim 1, further comprising:
determining, by at least one of the plurality of provisioner nodes, whether a service instance has failed; and
performing a failover, based on a determination that a service instance has failed, from the failed service instance to another service instance.

18. A system comprising:
one or more hardware processors;
a plurality of provisioner nodes, each of the provisioner nodes being a separate process, the provisioner nodes executing on one or more hardware processors, wherein each provisioner node includes a plurality of processing threads;
a message queue that is coupled to the plurality of provisioner nodes, wherein the message queue receives a service request from a service broker; and
a memory storing instructions that, when executed by at least one of the one or more hardware processors, cause the system to perform operations comprising:
retrieving, by a first one of the plurality of provisioner nodes from the message queue shared by the plurality of provisioner nodes, a first message comprising a first service request, the first service request comprising a request to provision a first service instance on the computing infrastructure;
wherein a first processing thread of the first one of the provisioning nodes retrieves the first service request resulting in the first service request being unavailable to other processing threads of other provisioner nodes;
determining, at the one of the plurality of provisioner nodes, whether a first resource of the computing infrastructure capable of hosting the first service instance is available;
in response to a determination that a resource of the computing infrastructure capable of hosting the service instance does not exist, creating, on the computing infrastructure, a new resource capable of hosting the first service instance, the new resource not existing prior to making the determination;
deploying and configuring of software for providing the first service instance on the first or new resource;
retrieving, by a second one of a plurality of provisioner nodes from the message queue shared by the plurality of provisioner nodes, a second message comprising a second service request, the second service request comprising a request to deprovision a second service instance on the computing infrastructure;
wherein a second processing thread of the second one of the provisioning nodes retrieves the second service request resulting in the second service request being unavailable to other processing threads of other provisioner nodes;
identifying a second resource of the infrastructure hosting the second service instance and responsively removing the second resource from the infrastructure;
retrieving, by a third one of a plurality of provisioner nodes from the message queue shared by the plurality of provisioner nodes, a third message comprising a third service request, the third service request comprising a request to bind or unbind a resource instance with a n application;
wherein a third processing thread of the third one of the provisioning nodes retrieves the third service request resulting in the third service request being unavailable to other processing threads of other provisioner nodes;
wherein the third processing thread performs the binding or unbinding, or issues a service node request to resources of the infrastructure to perform the binding or unbinding;
wherein the first processing thread of the first one of the plurality of service nodes, the second processing thread of the second one of the plurality of service nodes, and the third processing thread of the third one of the plurality of service nodes perform operations concurrently;
wherein each of the plurality of provisioner nodes is operated to purposefully and horizontally scale the computing infrastructure by determining an amount of infrastructure that is currently available for provisioning of resources and service instances, and when the amount is below a predetermined range, reserve additional infrastructure, and when the amount infrastructure exceeds the predetermined range, release at least some of the infrastructure, wherein the horizontal scaling is dynamic and occurs over time.

19. A non-transitory computer-readable storage medium storing instructions that, when executed by at least one hardware processor of a machine, cause the machine to perform operations wherein a plurality of provisioner nodes is provided, each of the provisioner nodes being a separate process, the provisioner nodes executing on one or more hardware processors, wherein each provisioner node includes a plurality of processing threads, wherein a message queue that is coupled to the plurality of provisioner nodes is also provided, wherein the message queue receives a service request from a service broker, wherein the operations are comprising:
retrieving, by a first one of the plurality of provisioner nodes from the message queue shared by the plurality of provisioner nodes, a first message comprising a first service request, the first service request comprising a request to provision a first service instance on the computing infrastructure;
wherein a first processing thread of the first one of the provisioning nodes retrieves the first service request resulting in the first service request being unavailable to other processing threads of other provisioner nodes;

determining, at the one of the plurality of provisioner nodes, whether a first resource of the computing infrastructure capable of hosting the first service instance is available;

in response to a determination that a resource of the computing infrastructure capable of hosting the service instance does not exist, creating, on the computing infrastructure, a new resource capable of hosting the first service instance, the new resource not existing prior to making the determination;

deploying and configuring of software for providing the first service instance on the first or new resource;

retrieving, by a second one of a plurality of provisioner nodes from the message queue shared by the plurality of provisioner nodes, a second message comprising a second service request, the second service request comprising a request to deprovision a second service instance on the computing infrastructure;

wherein a second processing thread of the second one of the provisioning nodes retrieves the second service request resulting in the second service request being unavailable to other processing threads of other provisioner nodes;

identifying a second resource of the infrastructure hosting the second service instance and responsively removing the second resource from the infrastructure;

retrieving, by a third one of a plurality of provisioner nodes from the message queue shared by the plurality of provisioner nodes, a third message comprising a third service request, the third service request comprising a request to bind or unbind a resource instance with a n application;

wherein a third processing thread of the third one of the provisioning nodes retrieves the third service request resulting in the third service request being unavailable to other processing threads of other provisioner nodes;

wherein the third processing thread performs the binding or unbinding, or issues a service node request to resources of the infrastructure to perform the binding or unbinding;

wherein the first processing thread of the first one of the plurality of service nodes, the second processing thread of the second one of the plurality of service nodes, and the third processing thread of the third one of the plurality of service nodes perform operations concurrently;

wherein each of the plurality of provisioner nodes is operated to purposefully and horizontally scale the computing infrastructure by determining an amount of infrastructure that is currently available for provisioning of resources and service instances, and when the amount is below a predetermined range, reserve additional infrastructure, and when the amount infrastructure exceeds the predetermined range, release at least some of the infrastructure, wherein the horizontal scaling is dynamic and occurs over time.

* * * * *